(12) United States Patent
Persohn (10) Patent No.: US 7,600,790 B2
(45) Date of Patent: Oct. 13, 2009

(54) COUPLING ASSEMBLY WITH CONNECTION INDICATOR

(75) Inventor: Matthew M. Persohn, Toledo, OH (US)

(73) Assignee: Eaton Corporation, Cleveland, OH (US)

( * ) Notice: Subject to any disclaimer, the term of this patent is extended or adjusted under 35 U.S.C. 154(b) by 76 days.

(21) Appl. No.: 10/969,467

(22) Filed: Oct. 20, 2004

(65) Prior Publication Data

US 2006/0082151 A1  Apr. 20, 2006

(51) Int. Cl.
*F16L 35/00* (2006.01)
(52) U.S. Cl. .......................................... 285/93; 285/39
(58) Field of Classification Search ............ 285/39, 285/321; 33/501.45
See application file for complete search history.

(56) References Cited

U.S. PATENT DOCUMENTS 3,177,018 A * 4/1965 Goodwin ................... 285/277
4,471,978 A * 9/1984 Kramer ...................... 285/321
4,872,710 A * 10/1989 Konecny et al. ............ 285/321
5,752,726 A * 5/1998 Fixemer ...................... 285/39
6,183,020 B1 * 2/2001 Luft ............................ 285/93

* cited by examiner

*Primary Examiner*—Aaron M Dunwoody
(74) *Attorney, Agent, or Firm*—Dykema Gossett PLLC (57) ABSTRACT

A coupling assembly includes a first coupling member that extends along an axis from a forward end toward a rearward end and includes a first locking surface and a first connection indicator positioned between the first locking surface and the rearward end. A second coupling member includes a receptacle for receiving the forward end of the first coupling member, an interior surface having a second locking surface and an exterior surface that may include a second connection indicator. A locking member is positionable between the first and second locking surfaces to connect the first and second coupling members. A release member is adapted to cover the first and second connection indicators when the locking member is positioned between then first and second locking surfaces and to expose at least one of the first and second connection indicators when the first and second coupling members are disconnected.

31 Claims, 8 Drawing Sheets

COUPLING ASSEMBLY WITH CONNECTION INDICATOR

BACKGROUND OF THE INVENTION

1. Field of the Invention

The present invention relates to push-to-connect style fluid connectors and, more particularly, to a push-to-connect style coupling assembly that includes a connection indicator to indicate when a male coupling member is connected to a female coupling member.

2. Description of the Related Art

There are many industrial applications where a relatively high pressure hydraulic system requires that several connections be made between a hose assembly and a component, such as a pump, motor or valve. In the past there were no push-to-connect (threadless) connection systems available that could satisfactorily operate at high pressure. Consequently, prior art hydraulic systems commonly made use of threaded fittings to make this connection. Recently, push-to-connect style coupling assemblies have become available that operate at relatively high pressures. In one such coupling assembly, a resiliently expandable locking ring is employed to secure a male coupling member within a female coupling member. As the male coupling member is inserted into the female coupling member, the locking ring becomes trapped between a male locking surface and a female locking surface to prevent withdrawal of the male coupling member from the female coupling member.

While locking ring style coupling assemblies have proven successful in use, there are instances when the male coupling member, while appearing to be connected to the female member, may not be connected due to a failure to push the male coupling member into the female coupling member a distance sufficient to position the locking ring between the male locking surface and the female locking surface. For these and other reasons, an improved coupling assembly is desired that provides an indication that the male coupling member is connected to the female coupling member.

SUMMARY OF THE INVENTION

A coupling assembly is provided that includes a first coupling member and a second coupling member. The first coupling member extends along an axis from a forward end toward a rearward end and includes a first locking surface and a first connection indicator positioned between the first locking surface and the rearward end. A second coupling member includes a receptacle for receiving the forward end of the first coupling member. The second coupling member further includes an interior surface having a second locking surface and an exterior surface that may include a second connection indicator. A locking member is positionable between the first and second locking surfaces to connect the first coupling member to the second coupling member. A release member is adapted to cover the first and second connection indicators when the locking member is positioned between then first and second locking surfaces and to expose at least one of the first and second connection indicators when the first and second coupling members are disconnected.

BRIEF DESCRIPTION OF THE DRAWINGS

Embodiments of the invention will now be described, by way of example, with reference to the accompanying drawings, wherein.

DETAILED DESCRIPTION OF THE INVENTION

Certain terminology will be used in the foregoing description for convenience in reference only and will not be limiting. The terms "forward" and "rearward" will refer to directions forward and rearward of the coupling assembly shown in the drawings. The terms "inwardly" and "outwardly" will refer to directions toward and away from, respectively, the geometric center of the apparatus. All foregoing terms mentioned above include the normal derivative and equivalents thereof.

Figure 1:
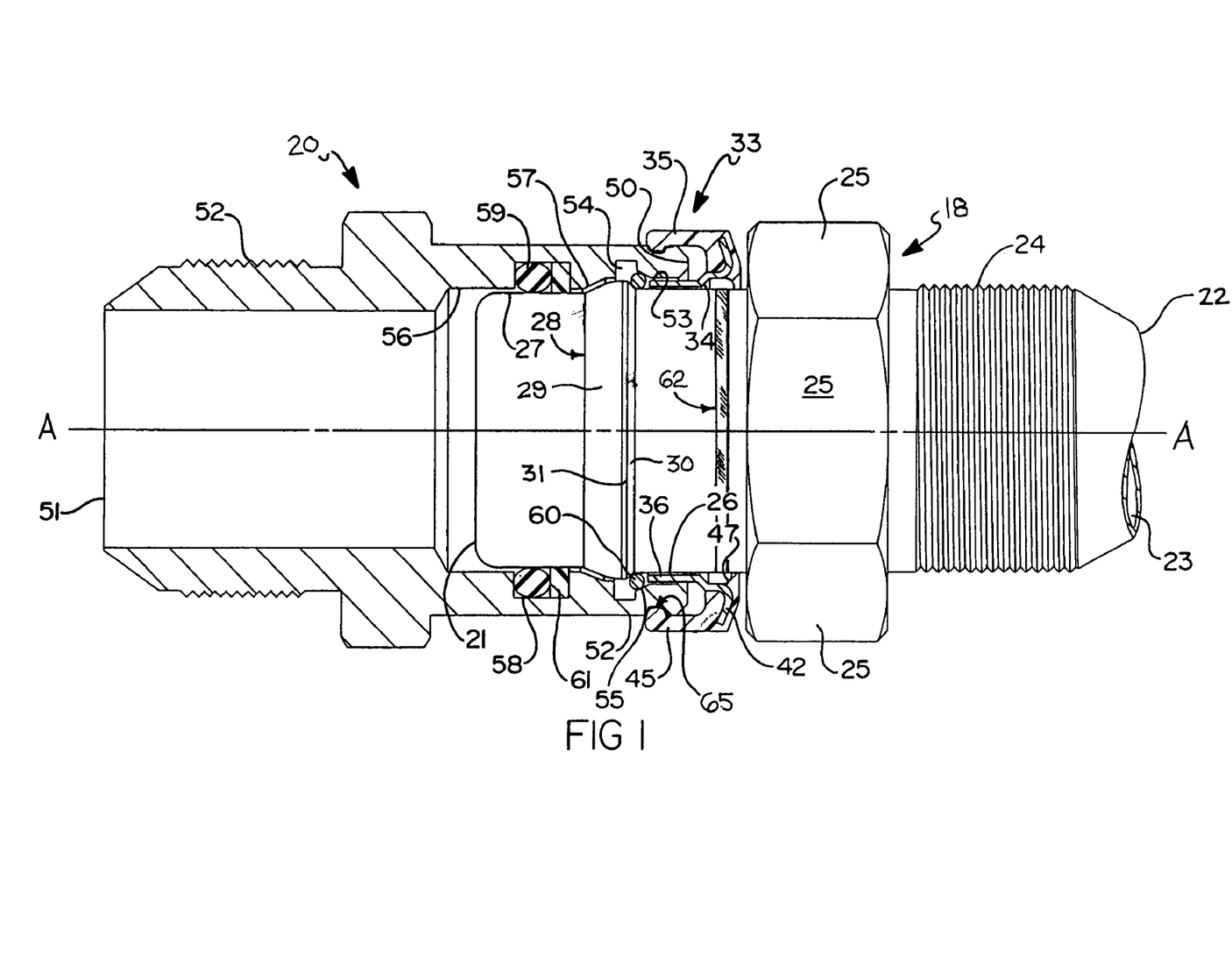
FIG. 1 is a partial cross-sectional view of a coupling assembly according to an embodiment of the present invention.

Referring to FIG. 1, a coupling assembly according to an embodiment of the present invention is shown that includes a first or male coupling member 18 and a second or female coupling member 20. Each of the first coupling member 18 and second coupling member 20 extend along an axis A-A when the assembly is in the coupled position as shown in FIG. 1. The first coupling member 18 extends from a leading end 21 intended for insertion into the second coupling member 20 to a trailing end 22 and has a passageway 23 extending therethrough. If desired, the trailing end 22 may be provided with external threads 24 for attachment to a threaded coupling (not shown) and a series of flats 25 defining a non-circular (e.g., hexagonal) cross-section for engagement by a wrench.

First coupling member 18 also includes a trailing exterior surface 26 and a leading exterior surface 27, which are separated by a rib 28 that includes a ramp 29 tapering rearwardly and outwardly from leading exterior surface 27. In the illustrated embodiments, ramp 29 exhibits a linear profile that tapers at an angle in the range of about 10° to 25° relative to the axis A-A. However, ramp 29 is not limited to the profile shown in FIGS. 1-7 or the characteristics described above, and may include other profiles, including without limitation, a concave or other non-linear profile, without departing from the scope of the present invention.

Rib 28 also includes a locking surface 30 that extends rearwardly and inwardly from an apex 31. Apex 31 is shown in the illustrated embodiments as being a generally flat surface that extends between ramp 29 and locking surface 30;

however, apex 31 may include other profiles, such as a rounded or other non-linear profile, or even no profile at all (i.e., a point formed by the intersection of ramp 29 and locking surface 30). In the illustrated embodiments, first locking surface 30 exhibits a linear profile that tapers at an angle in the range of about 35° to 55° relative to the axis A-A, such as an angle of about 45°. However, locking surface is not limited to the profile shown in FIGS. 1-7 and may include other profiles, including without limitation, a convex or other non-linear profile, without departing from the scope of the present invention.

In an embodiment of the invention, first coupling member 18 also includes a release member 33 having a rigid portion 34 and a flexible sealing portion 35 made from, for example, a resilient polymeric material. Rigid portion 34 may include a split cylindrical wall 36 having at least one slot that allows cylindrical wall 36 to expand and contract. Sealing portion 35 at least partially surrounds a flange 42 on rigid portion 34 located opposite leading end 37. Sealing portion 35 may include a cylindrical wall portion 45 spaced from and substantially parallel to the split cylindrical wall 36 of rigid portion 34. In an embodiment of the invention, wall portion 45 includes a bead 46 that engages a feature on the second coupling member 20, as will be described below. Sealing portion 35 may also include a sealing fin 47 extending radially inwardly from flange 42. Sealing fin 47 engages trailing exterior surface 26 and functions as a dust seal to prevent contaminants, such as dust and other debris, from entering the connected coupling assembly between release member 33 and trailing exterior surface 26.

Referring again to FIG. 1, second coupling member 20 extends from a receiving end 50 to a remote end 51, which may have adjacent thereto external threads 52 or other suitable connector for fastening to a separate component, such as a manifold or housing (not shown). The portion of second coupling member 20 adjacent receiving end 50 is provided with an exterior cylindrical surface 52 including a portion sized to be received within cylindrical wall 45 of release sleeve 33 and a receptacle having an interior cylindrical surface 53 sized to receive therein the split cylindrical wall portion 36 of release member 33. The receptacle of second coupling member 20 also includes an inwardly facing annular groove 54.

Figure 2A:
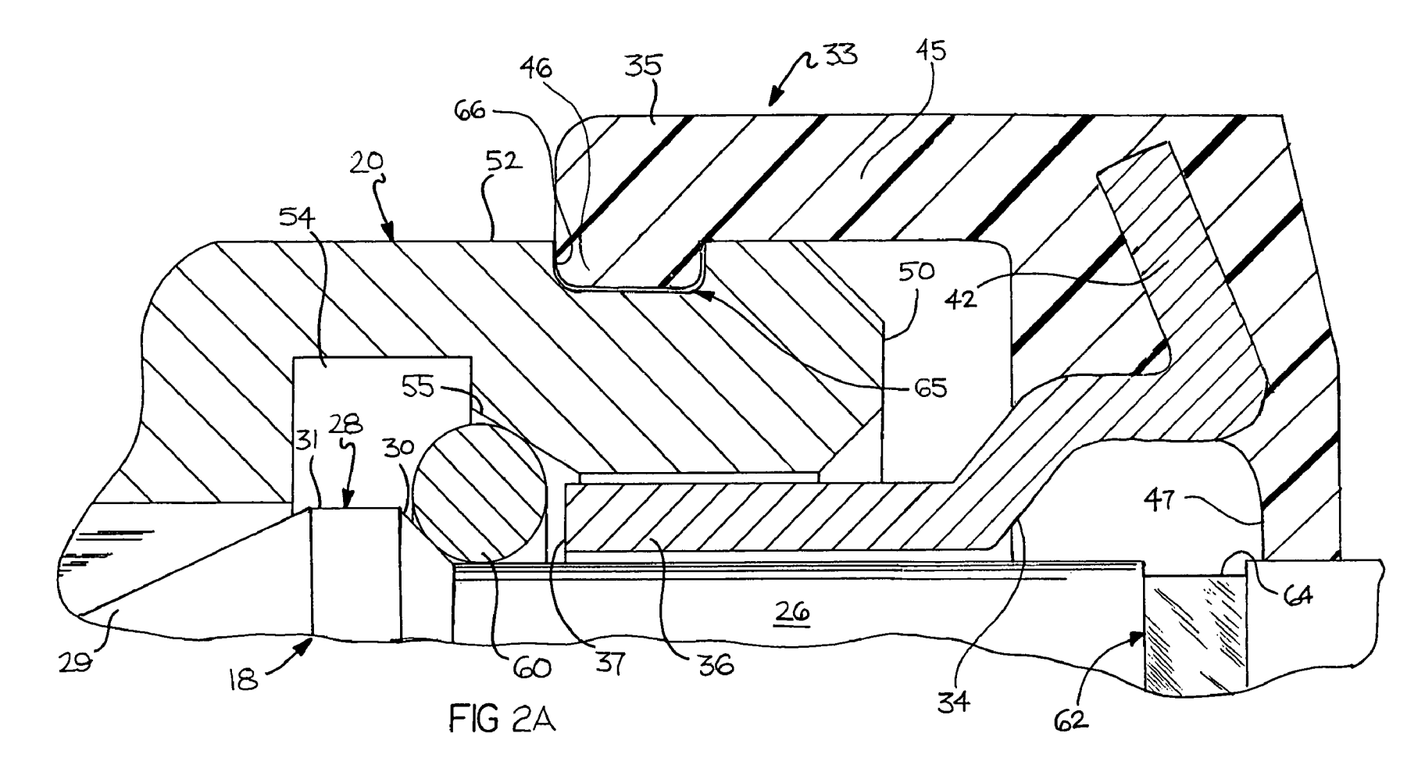
FIG. 2A is a partial cross-sectional view of the coupling assembly of FIG. 1, showing a connecting interface according to an embodiment of the present invention.

A second locking surface 55 extends generally outwardly from interior cylindrical surface 53 between surface 53 and inwardly facing annular groove 54. If second locking surface 55 is a chamfered surface, as shown in FIGS. 1 and 2A, the angle between locking surface 55 and interior cylindrical surface 53 is in the range of about 18° to 40° (e.g., about 30°, such that the angles of first locking surface 30 and second locking surface 55 converge as the locking surfaces 30, 55 extend outwardly and away from axis A-A. However, like first locking surface 30, second locking surface 55 is not limited to the profile shown in FIGS. 1 and 2A and may include other profiles, including without limitation, the profiles shown in FIGS. 2B and 2C, without departing from the scope of the present invention.

A second interior cylindrical surface 56 of smaller diameter than the first cylindrical surface 53 is positioned toward remote end 51 and is separated from surface 53 by a chamfer 57 positioned to accommodate ramp 29. Second interior cylindrical surface 56 is sized to receive leading exterior surface 27 of the first coupling member 18 and has formed therein an optional inwardly facing annular groove 58. An annular seal 59, such as neoprene or other suitable sealing material, and a rigid plastic ring 61 are received in annular groove 58. Annular seal 59 and plastic ring 61 have an outer diameter sized to snugly engage first exterior surface 27 of first coupling member 18. The presence of the rigid plastic ring 61 serves to protect the annular seal 59 from cutting or other damage upon insertion of the leading exterior surface 27 into the second coupling member 20. The rigid plastic ring 61 also serves to protect the annular seal 59 from damage when used in systems having high impulse flow of fluid.

Positioned in annular groove 54 is a locking member 60, such as a split metal locking ring and the like. When coupling members 18, 20 are disconnected, locking member 60 has an external diameter smaller than the diameter defined by the outermost portion of groove 54, but larger than the diameter of first interior cylindrical surface 53. Release member 60 has an internal diameter substantially equal to or even slightly smaller than that of trailing exterior surface 26 of first coupling member 18 to snugly engage such trailing exterior surface 26 when first coupling member 18 is connected to second coupling member 20. As will be appreciated, the internal diameter of release member 60 is, therefore, significantly smaller than the diameter of apex 31. Release member 60, by virtue of its dimensions, will be retained in groove 54 when first coupling member 18 is disconnected from second coupling member 20. However, the diametrical size of locking member 60 increases as the locking member 60 moves over the ramp 29 and apex 31 upon insertion of first coupling member 18 into second coupling member 20.

Figure 2B:
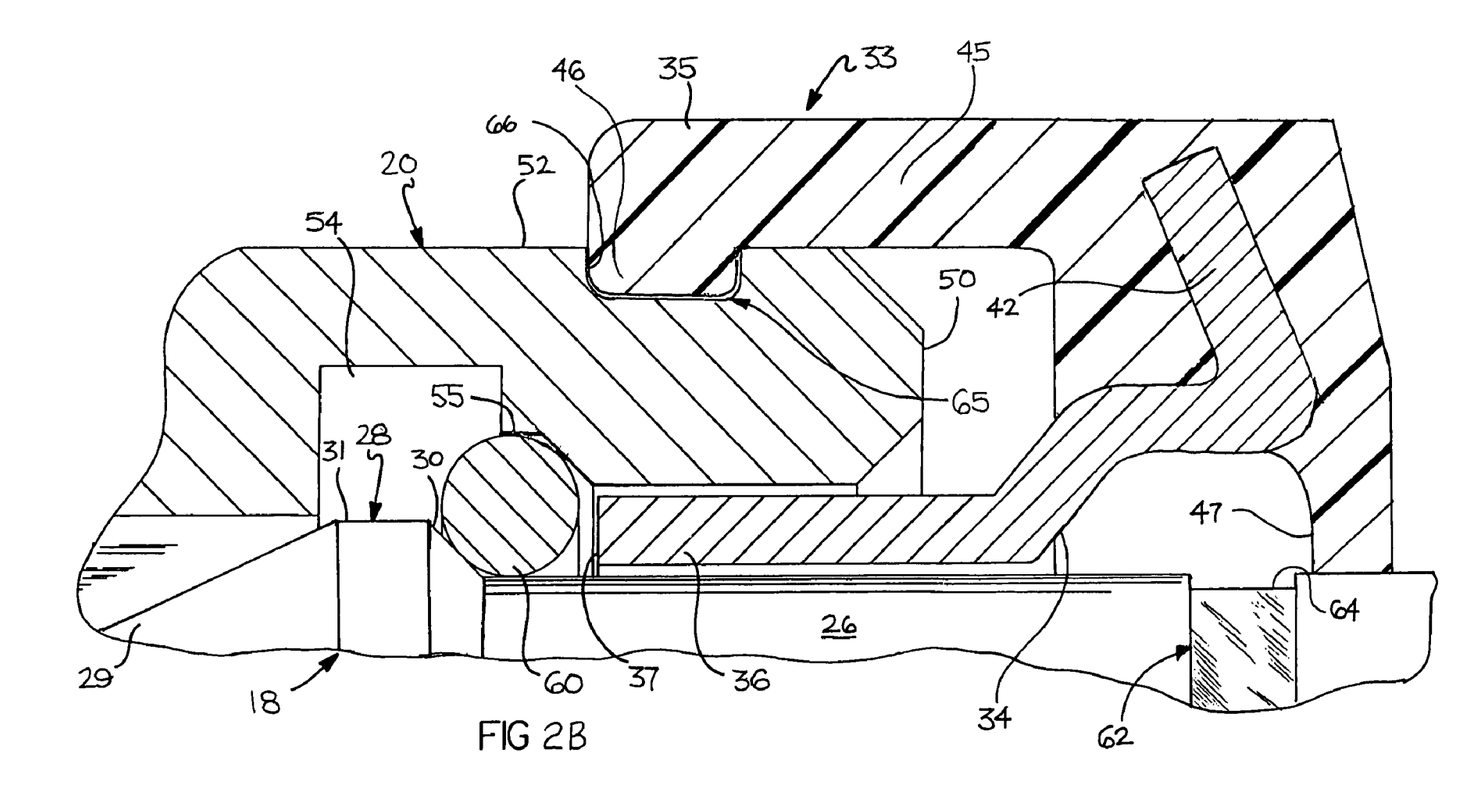
FIG. 2B is a partial cross-sectional view of a coupling assembly connecting interface according to another embodiment of the present invention.
Figure 2C:
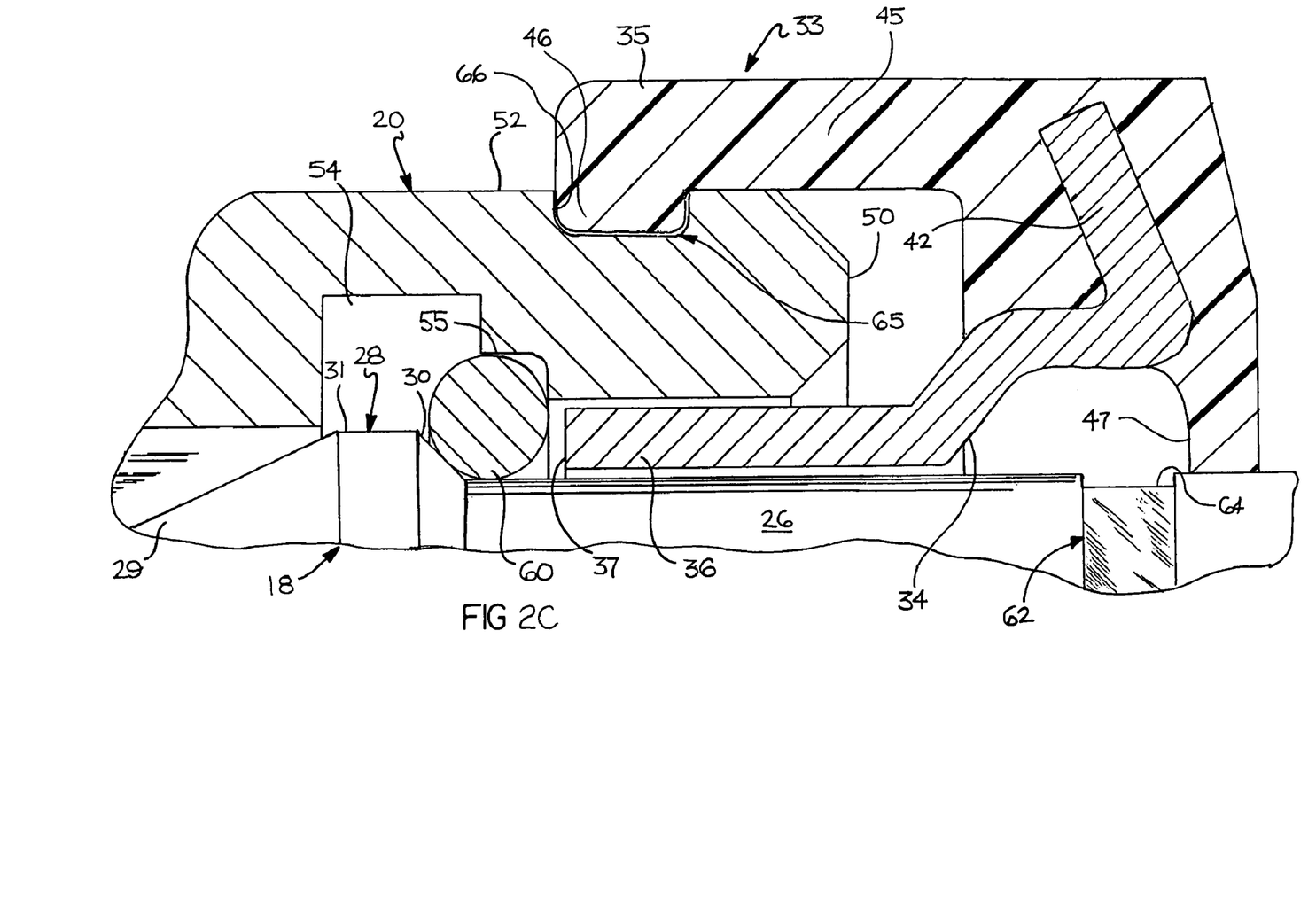
FIG. 2C is a partial cross-sectional view of a coupling assembly connecting interface according to another embodiment of the present invention.

Referring to FIGS. 1-2C, first coupling member 18 includes a first connection indicator 62 positioned between first locking surface 30 and rearward end 22. In an embodiment, first connection indicator 62 is positioned on first coupling member 18 and is covered by release member 33 when the first and second coupling members 18, 20 are connected and there is no wear in locking member 60 and/or first and second locking surfaces 30, 55 (see, e.g., FIG. 2A). In contrast, first connection indicator 62 is at least partially exposed when first and second coupling members 18, 20 are connected and locking member 60 and/or first and second locking surfaces 30, 55 are at least slightly worn (see, e.g., FIG. 5).

In an embodiment, first connection indicator 62 is configured as a continuous or non-continuous annular discontinuity in trailing exterior surface 26. Accordingly, at least a portion of first connection indicator 62 is visually enhanced or distinguishable relative to adjacent surfaces (e.g., trailing exterior surface 26) of first coupling member 18. For example, at least a portion of first connection indicator 62 may exhibit a first color and trailing exterior surface 26 may exhibit a second color. To further distinguish first connection indicator 62 from the adjacent surfaces of first coupling member 18, first connection indicator 62 may include an optional indentation or groove 64 in the generally flat trailing exterior surface 26 between first locking surface 30 and the rearward end 22. A portion of groove 64 may also exhibit a color different than the color of the surfaces adjacent groove 26 to visually enhance or distinguish the groove.

As also shown in FIGS. 1-2C, exterior cylindrical surface 52 of second coupling member 20 may include a second connection indicator 65. In an embodiment, second connection indicator 65 includes a latching groove 66 in exterior cylindrical surface 52 that is sized to receive at least a portion of bead 46 in release member 33 when locking member 60 is positioned between first and second locking surfaces 30, 55. Like first connection indicator 62, at least a portion of second connection indicator 65 may be visually enhanced or distinguishable relative to adjacent surfaces (e.g., exterior cylindrical surface 52) of second coupling member 20. For example, at least a portion of second connection indicator 65 may exhibit a first color and the surfaces of second coupling member 20 adjacent second connection indicator 65 may exhibit a second color. Alternatively, second connection indicator 65 may be configured without latching groove 66, in which case second connection indicator 65 may include any other visual discontinuity in exterior surface 52, such as a continuous or non-continuous annular band of color is different than the color of exterior surface 52 itself.

Figure 3:
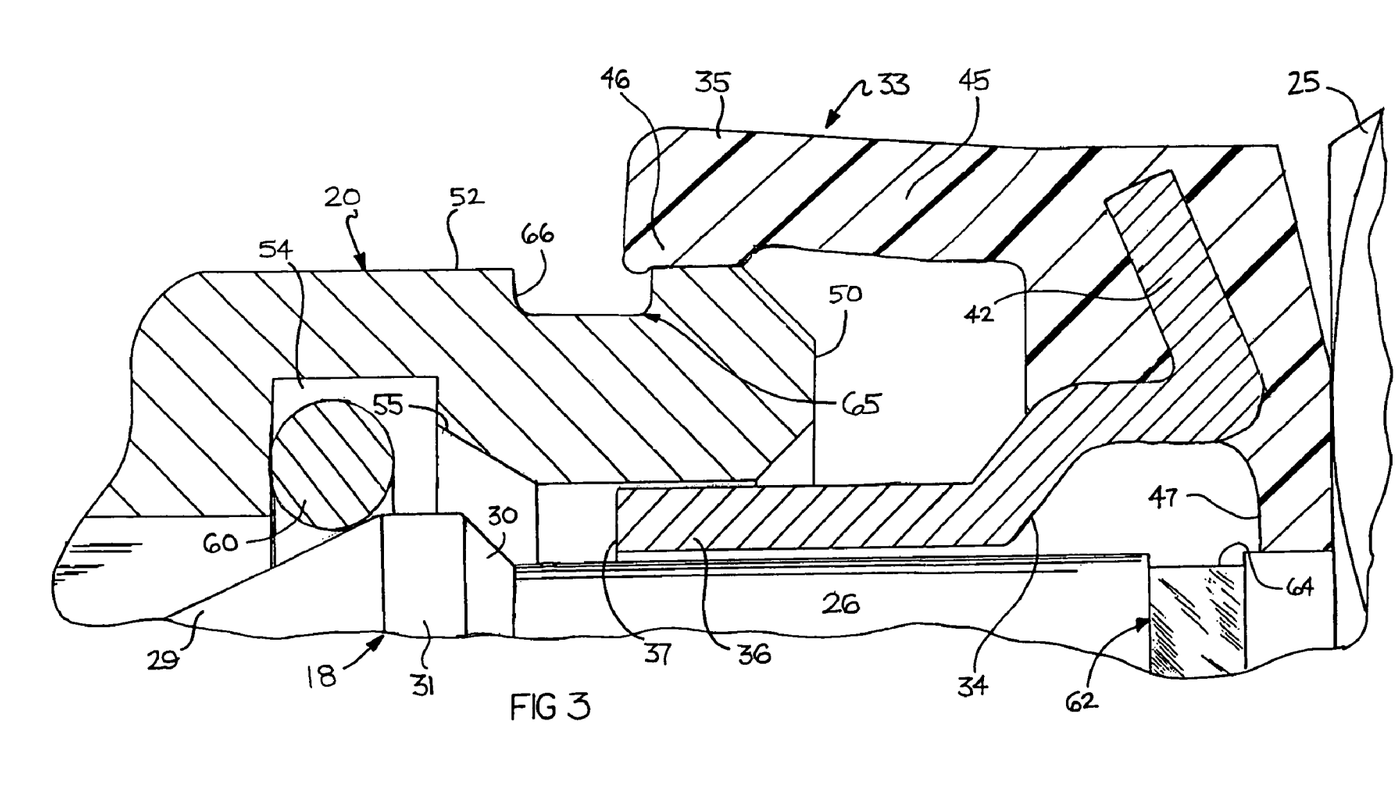
FIG. 3 is a partial cross-sectional view of the connecting interface of FIG. 2A shown prior to a first coupling member being connected to a second coupling member.
Figure 4:
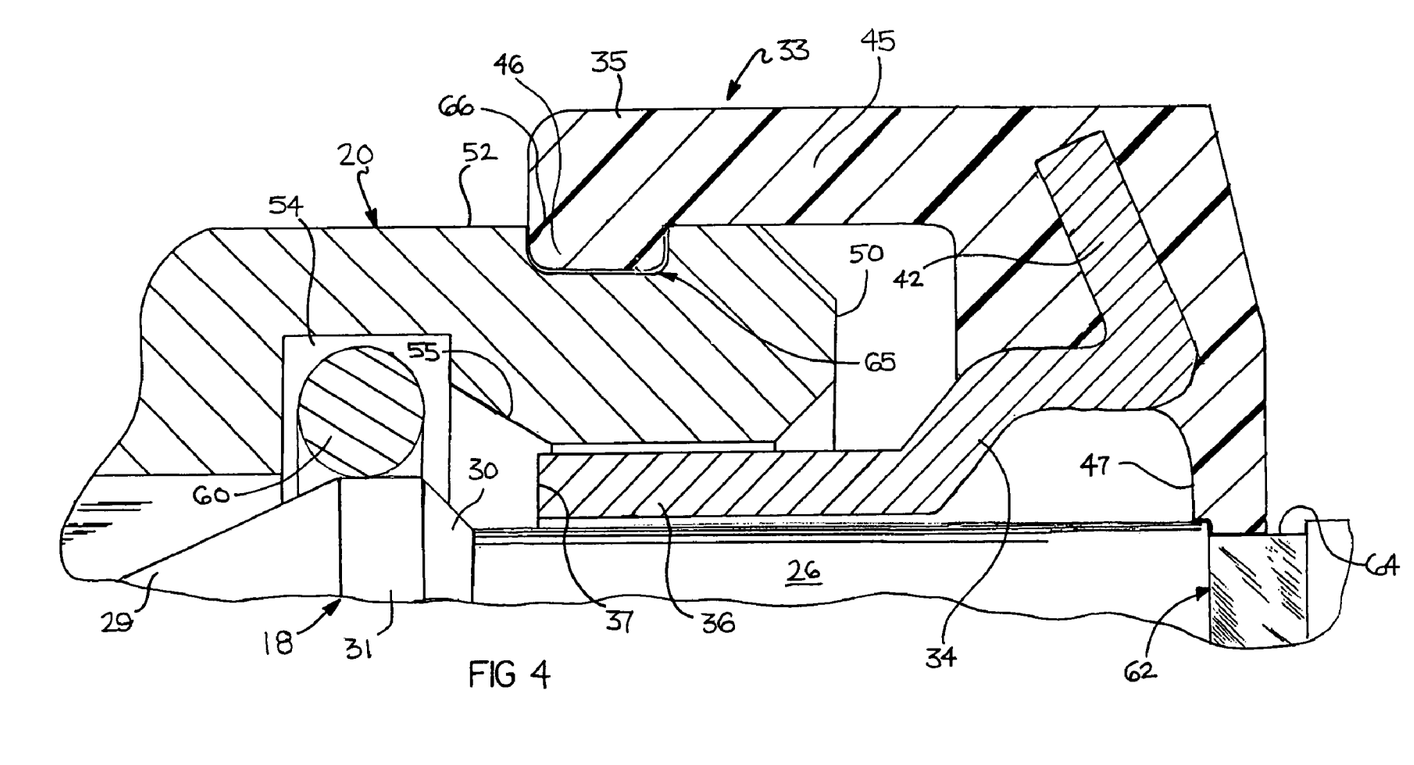
FIG. 4 is a partial cross-sectional view of the connecting interface of FIG. 2A shown prior to the first coupling member being connected to the second coupling member, but after a release member bead has been received in a second connection indicator on the second coupling member.

With reference to FIG. 3, upon insertion of first coupling member 18 into second coupling member 20, leading exterior surface 27 of first coupling member 18 will pass through locking member 60. Upon further movement of first coupling member 18 into second coupling member 20, locking member 60 will engage ramp 29 and expand into groove 54 as it rides over rib 28. As locking member 60 moves past apex 31 upon continued forward movement of first coupling member 18, the locking member 60, by virtue of its resilience, will contract to a size approaching its original size as it moves down first locking surface 30 and into engagement with trailing exterior surface 26. In doing so, locking member 60 will prevent withdrawal of first coupling member 18 from second coupling member 20 by virtue of the locking member 60 being positioned between first locking surface 30 on first coupling member 18 and second locking surface 55 on second coupling member 20 (see FIG. 2A).

As will be appreciated from viewing FIG. 2A, first locking surface 30 and second locking surface 55 may be disposed at converging angles in the direction toward leading end 21 when first coupling member 18 is connected to second coupling member 20. This convergence may result from the fact that the angle of first locking surface 30 is equal to or greater than the angle of second locking surface 55 in relation to axis A-A, as previously set forth, or vice versa. However, convergence of the angles defining first locking surface 30 and second locking surface 55 is not necessarily required, particularly when first locking surface 30 and second locking surface 55 do not exhibit the linear profiles shown in FIGS. 1 and 2A.

Referring still to FIG. 2A, when first coupling member 18 is connected to second coupling member 20, first connection indicator 62 and second connection indicator 65 are covered by release member 33 to provide a visual indication that the coupling assembly is connected. However, if first connection indicator 62 is exposed during assembly and second connection indicator 65 is covered (see, e.g., FIG. 4), then the exposed first connection indicator 62 provides a visual indication that the coupling assembly is not yet connected and further forward movement of first coupling member 18 into second coupling member 20 is required. This feature overcomes the problem associated with moving release member 33 forward on first coupling member 18 to cover second connection indicator 65 prior to moving the first coupling member 18 to the connection position shown in FIG. 2A.

Alternatively, if first connection indicator 62 is covered and second connection indicator 65 is exposed during assembly (see, e.g., FIG. 3), then the exposed second connection indicator 65 provides a visual indication that the coupling assembly is not yet connected and further forward movement of first coupling member 18 into second coupling member 20 is required. This feature overcomes the problem associated with moving first coupling member 18 within release member 33 to cover first connection indicator 62 prior to moving first coupling member 18 to the connection position. It will be appreciated that first connection indicator 62 may be employed in coupling assemblies that do not necessarily include a second connection indicator 65; however, one may not be able to visually determine whether or not the coupling assembly is connected in the scenario illustrated in FIG. 3.

Figure 5:
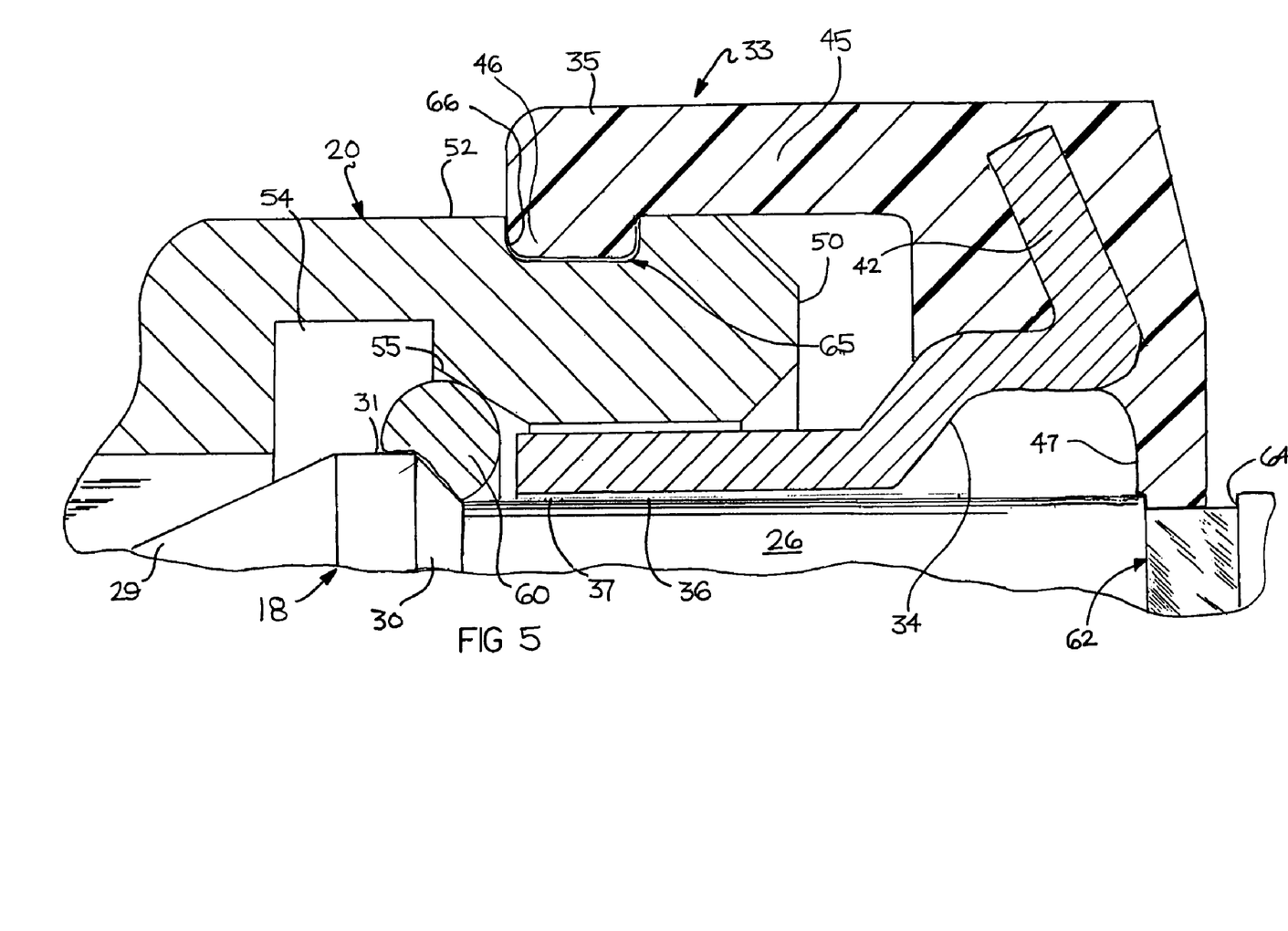
FIG. 5 is a partial cross-sectional view of the connecting interface of FIG. 2A shown after the first coupling member has been connected to the second coupling member and the locking member is worn.
Figure 6:
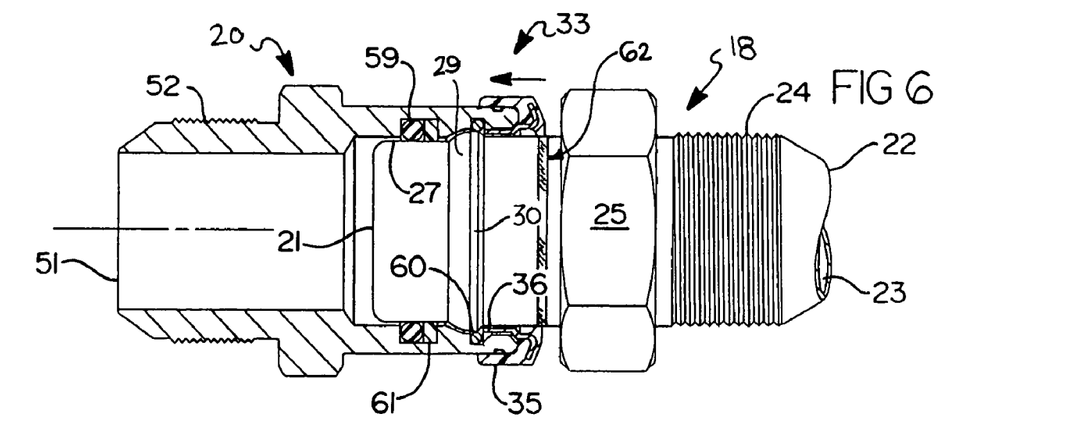
FIG. 6 is a partial cross-sectional view of the coupling assembly of FIG. 1 during disconnection.
Figure 7:
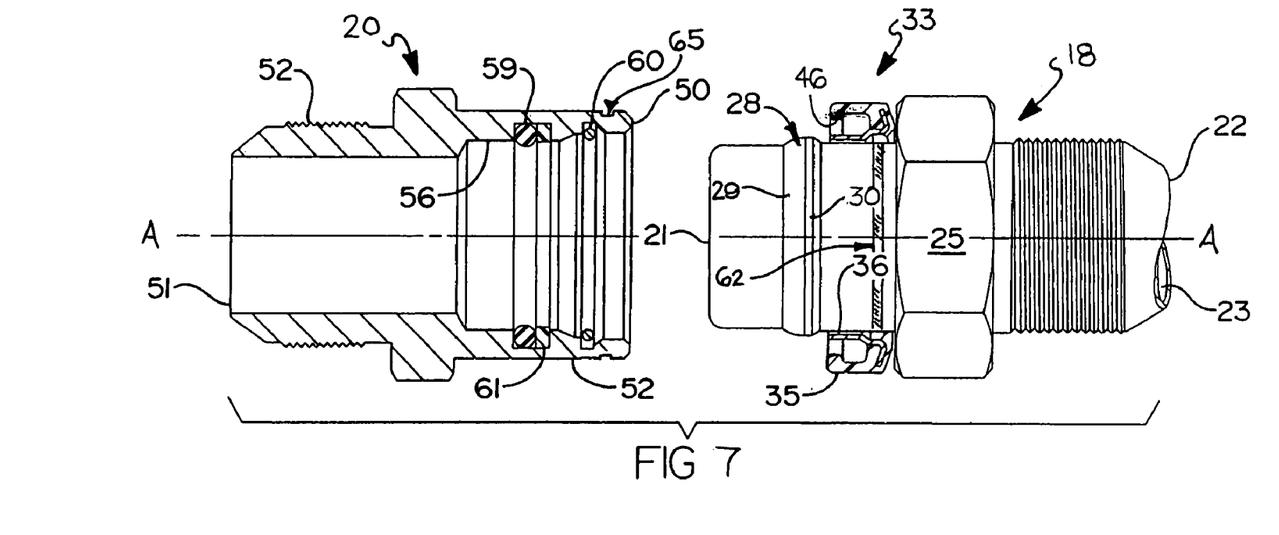
FIG. 7 is a partial cross-sectional view of the coupling assembly of FIG. 1 shown after disconnection.

In addition to providing a visual indication that the coupling assembly is connected, first connection indicator 62 may also function as a wear indicator to provide an indication that locking member 60 and/or first and second locking surfaces 30, 55 are worn. As shown in FIG. 5, locking member 60 (and/or locking surfaces 30, 55) may become worn or otherwise damaged during operation of the coupling assembly over time, allowing first coupling member 18 to be moved rearward in second coupling member 20 due to fluid pressure within the coupling assembly. Depending on the amount of wear in locking member 60 (and/or locking surfaces 30, 55) and the position of first connection indicator 62 in trailing exterior surface 26, first coupling member 18 may move rearward enough to allow first connection indicator 62 to become exposed and provide a visual indication that the coupling assembly is worn.

When the coupling assembly is connected, leading exterior surface 27 of first coupling member 18 is sealingly engaged with annular seal 59, thereby preventing leaking of fluid. Optionally, receiving end 50 and portions of second coupling member 20 adjacent thereto are positioned between cylindrical wall portion 45 of sealing portion 35 and split cylindrical wall 36 of rigid portion 34. The exterior cylindrical surface 52 is in contact with the interior of the cylindrical wall portion 45 to inhibit dust or other contaminants from entering the area around locking member 60 when the coupling members 18, 20 are in the connected position shown in FIGS. 1-2C.

As shown in FIG. 1, when first coupling member 18 is in the fully coupled or connected position with second coupling member 20, there is a gap between release member 33 and flats 25, forwardly of the non-circular cross-section defined by flats 25. Additionally, the leading end 37 of the release member split cylindrical wall 36 is barely touching or slightly spaced apart from locking member 60. When it is desired to disconnect first coupling member 18 from second coupling member 20, release member 33 is moved toward leading end 21, causing the leading end 37 of split cylindrical wall 36 to urge locking member 60 axially toward rib 28 and, in so doing, to be urged outwardly by first locking surface 30 against which locking member 60 is being urged by release member 33 (see, e.g., FIG. 6). As will be appreciated, when locking member 60 has been urged to a position in alignment with apex 31 of rib 28, first coupling member 18 will be released from second coupling member 20 and may be removed therefrom (see, e.g., FIG. 7).

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A coupling assembly comprising:
    a male coupling member extending along an axis from a forward end to a rearward end and including a first locking surface with at least a portion of the first locking surface disposed at an angle relative to the axis and a first connection indicator positioned between the first locking surface and the rearward end, wherein the first connection indicator is disposed on an exterior surface of the male coupling member;

a female coupling member including a receptacle for receiving the forward end of the male coupling member and an exterior cylindrical surface, the receptacle including a second locking surface with at least a portion of the second locking surface disposed at an angle relative to the axis and the exterior surface including a second connection indicator with a groove;

a locking member positionable between the first and second locking surfaces; and a release member adapted to radially cover the first and second connection indicators when the locking member is positioned between the first and second locking surfaces so that no portion of the first and second connection indicators is visible, wherein the first connection indicator is covered only by the release member, and to expose at least one of the first and second connection indicators when the first and second coupling members are disconnected.

2. The coupling assembly of claim 1, wherein the first locking surface forms a portion of a rib on the male coupling member and, wherein the locking member is sized such that, upon insertion of the male coupling member into the receptacle of the female coupling member, the locking member is adapted to expand as it passes over the rib and then contract to become positioned between the first locking surface and the second locking surface.

3. The coupling assembly of claim 1, wherein the release member covers at least a portion of the exterior cylindrical surface of the female coupling member, and the first connection indicator is positioned on the male coupling member to be covered by the release member when the male and female coupling members are connected and there is no wear in the coupling assembly and to be at least partially exposed when the male and female coupling members are connected and the coupling assembly is worn.

4. The coupling assembly of claim 1, wherein at least a portion of the first connection indicator is visually enhanced or distinguishable relative to an adjacent surface of the male coupling member.

5. The coupling assembly of claim 1, wherein the first connection indicator includes a discontinuity in an exterior surface of the male coupling member.

6. The coupling assembly of claim 1, wherein at least a portion of the first connection indicator exhibits a first color and a surface of the male coupling member adjacent the first connection indicator exhibits a second color.

7. The coupling assembly of claim 1, wherein the first connection indicator includes a groove in a generally flat outer surface of the male coupling member between the first locking surface and the rearward end.

8. The coupling assembly of claim 1, wherein at least a portion of the second connection indicator is visually enhanced or distinguishable relative to the exterior surface of the female coupling member.

9. The coupling assembly of claim 1, wherein at least a portion of the second connection indicator exhibits a first color and the exterior surface of the female coupling member adjacent the second connection indicator exhibits a second color.

10. The coupling assembly of claim 1, wherein the second connection indicator includes a groove in the exterior surface of the female coupling member, the release member including a flexible sealing portion having a bead adapted to be received within the groove when the locking member is positioned between the first and second locking surfaces.

11. A coupling assembly comprising:

a male coupling member extending along an axis from a forward end to a rearward end and including a first locking surface with at least a portion of the first locking surface disposed at an angle relative to the axis and a first connection indicator positioned between the first locking surface and the rearward end, the first connection indicator including a discontinuity in an exterior surface of the male coupling member;

a female coupling member including a receptacle for receiving the forward end of the male coupling member and an exterior surface, the receptacle including a second locking surface with at least a portion of the second locking surface disposed at an angle relative to the axis and the exterior surface of the female coupling member including a second connection indicator, the second connection indicator including a latching groove;

a locking member positionable between the first and second locking surfaces to connect the male coupling member to the female coupling member; and a release member including a bead adapted to be received within the latching groove when the locking member is positioned between the first and second locking surfaces, the discontinuity positioned on the male coupling member to be radially covered by the release member, such that the discontinuity is covered only by the release member, when the male and female coupling members are connected and there is no wear in the coupling assembly so that no portion of the discontinuity is visible and at least partially exposed when the coupling assembly is disconnected or worn.

12. The coupling assembly of claim 11, wherein the first locking surface forms a portion of a rib on the male coupling member and, wherein the locking member is sized such that, upon insertion of the male coupling member into the receptacle of the female coupling member, the locking member is adapted to expand as it passes over the rib and then contract to become positioned between the first locking surface and the second locking surface.

13. The coupling assembly of claim 11, wherein the release member is adapted to expose at least one of the first and second connection indicators when the male and female coupling members are disconnected.

14. The coupling assembly of claim 11, wherein at least a portion of the discontinuity exhibits a first color and the exterior surface of the male coupling member adjacent the discontinuity exhibits a second color.

15. The coupling assembly of claim 11, wherein the discontinuity includes a groove in the exterior surface of the male coupling member.

16. The coupling assembly of claim 15, wherein at least a portion of the groove exhibits a first color and the exterior surface of the male coupling member adjacent the groove exhibits a second color.

17. The coupling assembly of claim 11, wherein at least a portion of the latching groove exhibits a first color and the exterior surface of the female coupling member adjacent the latching groove exhibits a second color.

18. A coupling assembly comprising:

a male coupling member extending along an axis from a forward end to a rearward end and including a first locking surface with at least a portion of the first locking surface disposed at an angle relative to the axis and a first means for determining the connected state of the coupling assembly, wherein the first means is disposed on an exterior surface of the male coupling member;
a female coupling member including a receptacle for receiving the forward end of the male coupling member and an exterior surface, the receptacle including an interior surface having a second locking surface with at least a portion of the second locking surface disposed at an angle relative to the axis and the exterior surface including a second means for determining the connected state of the coupling assembly;
a locking member positionable between the first and second locking surfaces to connect the male coupling member to the female coupling member; and
a release member adapted to radially cover the first and second means for determining the connected state of the coupling assembly when the locking member is positioned between the first and second locking surfaces so that no portion of the first and second means is visible, wherein the first means is covered only by the release member, and to expose at least one of the first and second means for determining the connected state of the coupling assembly when the male and female coupling members are disconnected.

19. The coupling assembly of claim 18, wherein the first locking surface forms a portion of a rib on the male coupling member and, wherein the locking member is sized such that, upon insertion of the male coupling member into the receptacle of the female coupling member, the locking member is adapted to expand as it passes over the rib and then contract to become positioned between the first locking surface and the second locking surface.

20. The coupling assembly of claim 18, wherein the first means for determining the connected state of the coupling assembly is positioned on the male coupling member to be covered by the release member when the male and female coupling members are connected and there is no wear in the coupling assembly and to be at least partially exposed when the male and female coupling members are connected and the coupling assembly is worn.

21. The coupling assembly of claim 18, wherein at least a portion of the first means for determining the connected state of the coupling assembly is visually enhanced or distinguishable relative to an adjacent surface of the male coupling member.

22. The coupling assembly of claim 18, wherein at least a portion of the first means for determining the connected state of the coupling assembly exhibits a first color and a surface of the male coupling member adjacent the first means for determining the connected state of the coupling assembly exhibits a second color.

23. The coupling assembly of claim 18, wherein at least a portion of the second means for determining the connected state of the coupling assembly is visually enhanced or distinguishable relative to the exterior surface of the female coupling member.

24. The coupling assembly of claim 18, wherein at least a portion of the second means for determining the connected state of the coupling assembly exhibits a first color and a surface of the female coupling member adjacent the second means for determining the connected state of the coupling assembly exhibits a second color.

25. A coupling assembly comprising:
a male coupling member extending along an axis from a forward end toward a rearward end and including a first locking surface with at least a portion of the first locking surface disposed at an angle relative to the axis and a first connection indicator, wherein the first connection indicator is disposed on an exterior surface of the male coupling member;
a female coupling member including an exterior surface with a second connection indicator and a receptacle for receiving the forward end of the male coupling member, the first connection indicator and the second connection indicator having the same orientation relative to the axis of the male coupling member, the receptacle including an interior surface having a second locking surface with at least a portion of the second locking surface disposed at an angle relative to the axis;
a locking member positionable between the first and second locking surfaces to connect the male coupling member to the female coupling member;
and a release member adapted to radially cover a portion of the exterior surface of the female coupling member, and to cover the first connection indicator and the second connection indicator when the locking member is positioned between the first and second locking surfaces so that no portion of the first and second connection indicators is visible, wherein the first connection indicator is covered only by the release member, and to expose at least one of the first and second connection indicators when the coupling assembly is disconnected or worn.

26. The coupling assembly of claim 25, wherein the first locking surface forms a portion of a rib on the male coupling member and, wherein the locking member is sized such that, upon insertion of the male coupling member into the receptacle of the female coupling member, the locking member is adapted to expand as it passes over the rib and then contract to become positioned between the first locking surface and the second locking surface.

27. The coupling assembly of claim 25, wherein the first connection indicator is positioned on the male coupling member to be covered by the release member when the male and female coupling members are connected and there is no wear in the coupling assembly and to be at least partially exposed when the male and female coupling members are connected and the coupling assembly is worn.

28. The coupling assembly of claim 25, wherein at least a portion of the first connection indicator is visually enhanced or distinguishable relative to an adjacent surface of the male coupling member.

29. The coupling assembly of claim 25, wherein at least a portion of the first connection indicator exhibits a first color and a surface of the male coupling member adjacent the first connection indicator exhibits a second color.

30. The coupling assembly of claim 25, wherein the first connection indicator includes a groove in a generally flat outer surface of the male coupling member between the first locking surface and the rearward end.

31. A coupling assembly comprising:
a male coupling member extending along an axis from a forward end to a rearward end and including a first locking surface with at least a portion of the first locking surface disposed at an angle relative to the axis and a first connection indicator positioned between the first locking surface and the rearward end, wherein the first connection indicator is disposed on an exterior surface of the male coupling member;
a female coupling member including a receptacle for receiving the forward end of the male coupling member and an exterior surface, the receptacle including a second locking surface with at least a portion of the second locking surface disposed at an angle relative to the axis and the exterior surface including a second connection indicator with a groove in the exterior surface;

a locking member positionable between the first and second locking surfaces; and a release member adapted to radially cover the first and second connection indicators when the locking member is positioned between the first and second locking surfaces so that no portion of the first and second connection indicators is visible, wherein the first connection indicator is covered only by the release member, and to expose at least one of the first and second connection indicators when the male and female coupling members are disconnected;

wherein the first locking surface forms a portion of a rib on the male coupling member; the locking member is sized such that, upon insertion of the male coupling member into the receptacle of the female coupling member, the locking member is adapted to expand as it passes over the rib and then contract to become positioned between the first locking surface and the second locking surface; and the release member covers at least a portion of the exterior surface of the female coupling member, and the first connection indicator is positioned on the male coupling member to be covered by the release member when the male and female coupling members are connected and there is no wear in the coupling assembly and to be at least partially exposed when the male and female coupling members are connected and the coupling assembly is worn.

* * * * *